Jan. 31, 1950 C. V. LITTON 2,495,744

REACTANCE TUNING DEVICE

Filed Nov. 1, 1945 2 Sheets-Sheet 1

INVENTOR
CHARLES V. LITTON
BY Edward D. Phinney
ATTORNEY

Jan. 31, 1950 C. V. LITTON 2,495,744

REACTANCE TUNING DEVICE

Filed Nov. 1, 1945 2 Sheets-Sheet 2

INVENTOR
CHARLES V. LITTON
BY Edward D. [signature]
ATTORNEY

Patented Jan. 31, 1950

2,495,744

UNITED STATES PATENT OFFICE 2,495,744

REACTANCE TUNING DEVICE

Charles V. Litton, Redwood City, Calif.

Application November 1, 1945, Serial No. 626,131

2 Claims. (Cl. 250—27.5)

This invention relates to magnetrons and in particular to magnetrons of the plural cavity resonator type. More specifically, the invention provides an improved means for varying the resonant frequency of the cavities. The known methods of varying said resonant frequency are to reduce the effective inductance and to increase the effective capacitance of the cavities from their maximum and minimum values respectively. The reduction of the effective inductance is accomplished by positioning a suitable conductor adjacent that portion of the cavity carrying the maximum current. The flux due to this current generates a counter electromotive force in the conductor which in turn produces a current and a flux which opposes the original flux thereby reducing the inductance.

A known method of increasing the effective capacitance of resonant cavities is to place an annular conducting disk adjacent the open ends of the vanes which form the plurality of radial cavities of a magnetron, said disk and the edges of the vanes forming an additional parallel capacitance to that capacitance which inherently is between the vanes. A movement of the disk toward or away from the vanes changes the added capacitance inversely as the distance between the disk and the vanes and the variation in capacitance is obviously not linear.

It is the primary object of my invention to improve the present known method of varying the effective capacitance of magnetron cavities and to obtain a variation which is more nearly linear with respect to the moving element which causes the capacitance change.

Figure 1:
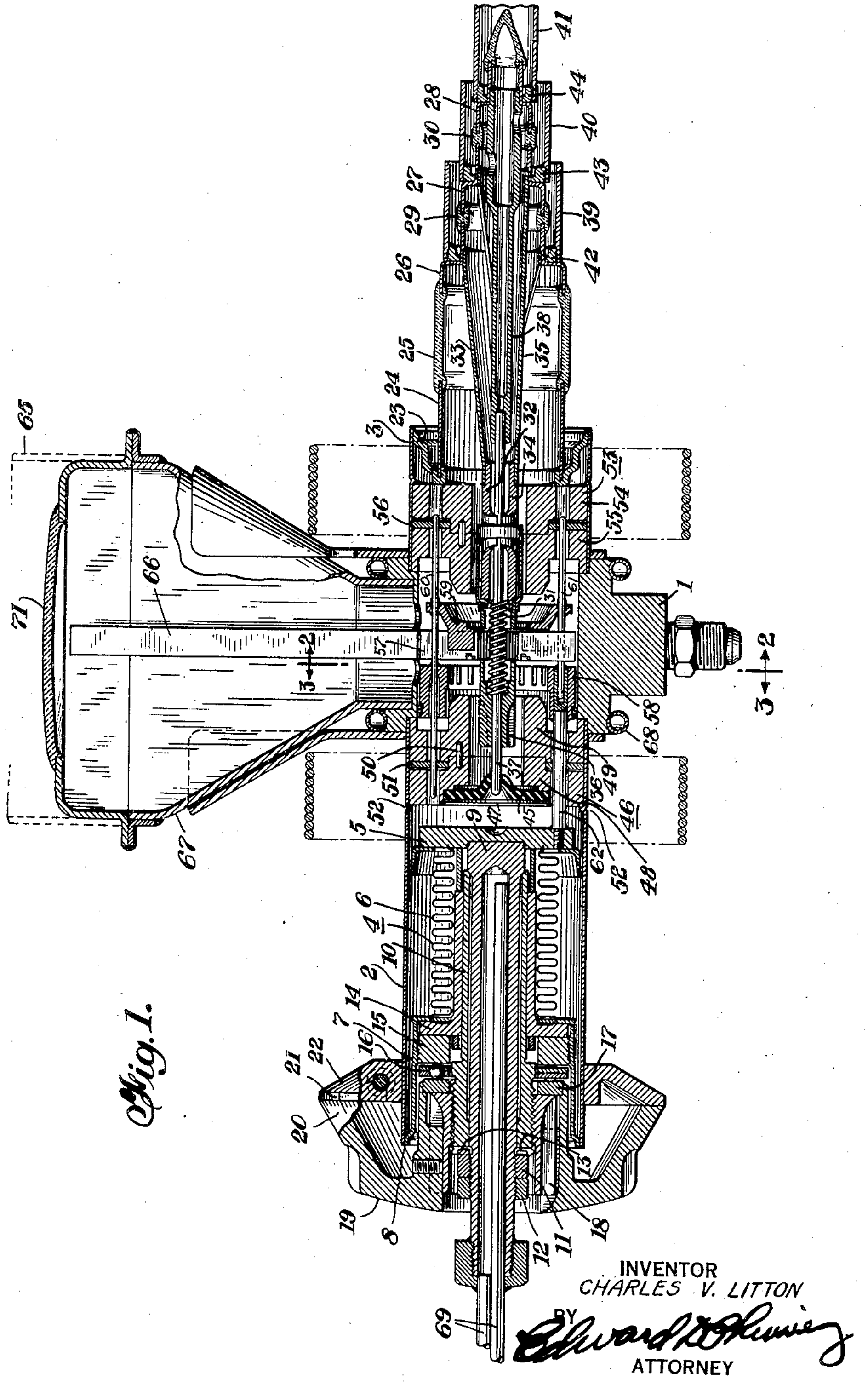

Another object of my invention is to provide a method of varying the effective capacitance which will result in a greater overall change in capacitance and therefore a greater range over which the frequency of a magnetron may be varied. Other objects and features of my invention will become apparent from the following description and claims together with the accompanying drawings of which:

Fig. 1 is a cross sectional view of a plural cavity magnetron and illustrates the capacitance varying element in its relation to associated parts with which it functions.

Figure 2:
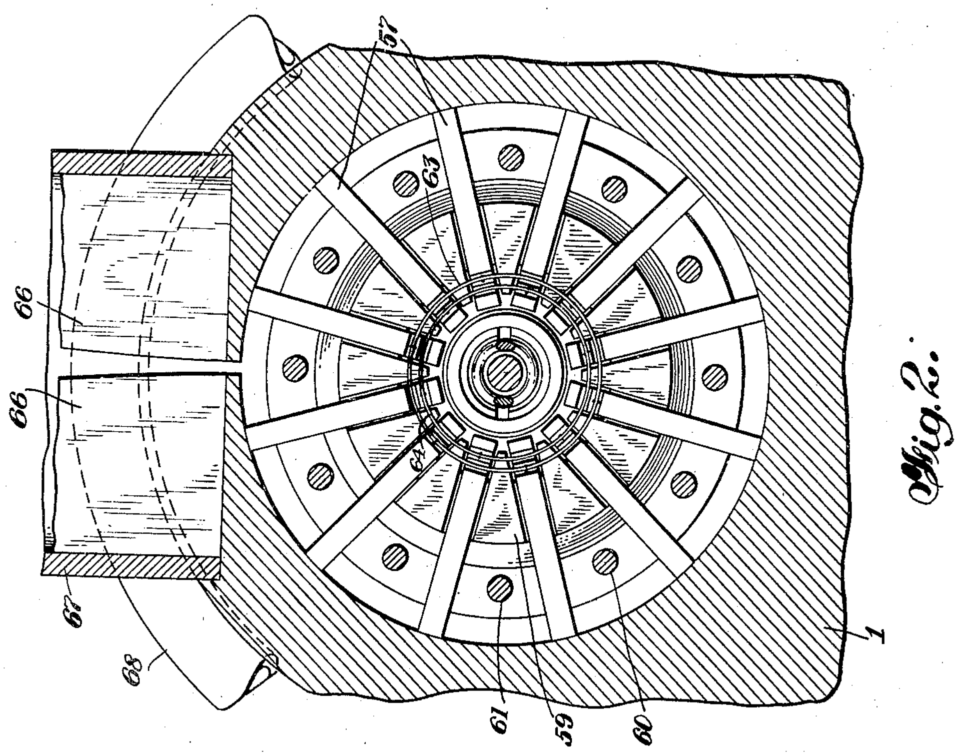

Fig. 2 is a partial view looking toward the plane perpendicular to the axis of symmetry at the section 2—2 of Fig. 1. The figure shows essentially the construction and positioning of the capacitance varying elements or C-ring. In this specification the capacitance varying element will be termed the C-ring in accordance with accepted practice. Likewise the inductance varying element will be termed the L-ring.

Figure 3:
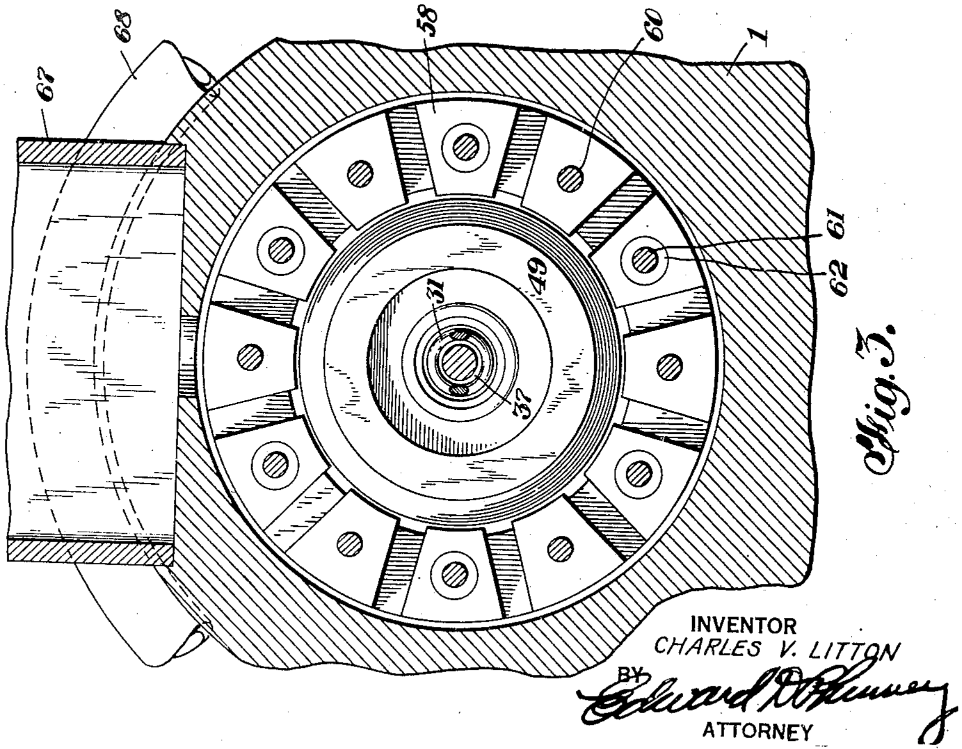

Fig. 3 is a partial sectional view looking toward the plane perpendicular to the axis of symmetry at the section 3—3 of Fig. 1. The figure shows the construction and positioning of the inductance varying element or L-ring.

Before describing my invention in detail I will first briefly describe the general features of a tunable magnetron in order that my invention will be more clearly understood. Certain other features of the magnetron are the subjects of copending applications and such features will be specifically pointed out as I proceed with the description.

Referring to the figures the reference character 1 represents the body of the magnetron to which other parts are brazed or otherwise suitably fastened until a structure capable of being evacuated has been formed. On one side of the body is a cylindrical extension 2 while on the other side there is a similar but shorter cylindrical extension 3, both extensions being brazed to the body 1.

The extension or housing 2 encloses an assembly 4 for adjusting the frequency to which the magnetron may be tuned as will be hereinafter described. This adjusting mechanism does not constitute a part of my present invention and a detailed description will therefore not be given. However in general, a platform 5 is brazed to a Sylphon bellows 6 which is in turn brazed to a bearing holder 7, the latter being brazed to the housing 2 along the circumference 8. When the magnetron is evacuated, the external atmospheric pressure tends to extend the bellows and force the platform 5 inwardly. This tendency must be constrained and a method for accomplishing same will now be described. A rod 9 is brazed to the platform 5 and extends through the bellows and the bearing holder. A hardened and ground sleeve 10 is held in position over the rod by the tongue nut 11 and the lock nut 12. The tongues 13 fit into slots in the sleeve 10. When the nuts are tightened this prevents any relative motion between the rod and the sleeve. A bearing 14 is positioned over the sleeve 10 and is clamped against the bottom of the bearing holder 7 by the inner ball race 15. The thrust bearing ball retainer with balls 16 and the outer ball race 17 are held against the race 15 by atmospheric pressure and the nut 18, the latter bearing against the race 17. Relative rotation between the nut 18 and the sleeve 10 determines the extent of the longitudinal motion of the platform 5. A control knob 19 is fastened to the nut 18 for turning the latter. A scale 20 is located on the outer diameter of the knob and is aligned adjacent a fixed scale 21 on an indicator ring 22, the latter being clamped to the extension 2 as shown. A measure of the longitudinal motion is thus obtained.

On the aforementioned cylindrical extension 3 is mounted the cathode support assembly. Since this assembly is not part of my present invention, but is described and claimed in a separate application, Serial Number 626,132, entitled "Cathode support," and filed November 1, 1945, which is now United States Patent No. 2,474,263 issued June 28, 1949. It will only be briefly described here. A support cup 23 is brazed to the extension 3 and to a tubular sealing member 24. This member and the other members which are part of the metal to glass seals for insulating the cathode supporting members one from another is preferably made of "Kovar" or other suitable material. Sealed to the member 24 is an insulating portion 25 followed by a series of three metal cups 26, 27 and 28 separated by glass portions 29 and 30. To the metal cups are attached the supporting members for the cathode 31. The cathode comprises two filament windings preferably of thoriated tungsten, so mounted and energized as to constitute a bifilar filament. In a bifilar filament the current in adjacent turns flows in opposite directions with the result that the magnetic field due to the current is substantially neutralized. If alternating current is employed to energize the filament as is usually the case in practice, the small amount of any residual alternating flux is insufficient to appreciably modulate the magnetron output current. One end of one filament is connected to a semi-cylindrical member 32 which is in turn fastened to a conical or other conoidal shaped support 33, the latter being brazed to the metal cup 26. One end of the other filament winding is connected in a similar manner through another semi-cylindrical sleeve member 34, and conical support 35 to metal cup 27. The other ends of each filament are connected to a member 36 which in turn is brazed to a rod 37, the latter being brazed to the central support 38. Power for energizing the cathode may be applied as required by connecting the power supply leads to the terminals 39, 40, and 41, these terminals being screwed onto threaded rings 42, 43, and 44 respectively. The rings are brazed to the metal cups 26, 27 and 28 thus insuring good electrical connections throughout.

The above described cathode support assembly is one of great rigidity. However, if still greater rigidity and freedom from possible vibration is required the rod 37 may be extended and inserted into a bearing in an insulating support ring 45 which may be held within the pole piece 46 by welding a ring 47 to the pole piece as shown.

The pole piece 46 is actually made in two parts 48 and 49 and held in alignment by the dowel pin 50. Between the two parts is a guide ring 51 having a plurality of holes therein which act as guides for the tuning structure, and together with said tuning structure forms one of the features of another of my inventions described in a separate application Serial Number 626,130, entitled "Adjustable magnetron," and filed November 1, 1945. The pole piece 46 is firmly held in place with extension 2 by crimping the latter against the pole piece at a plurality of points 52.

Similarly the pole piece 53 is divided into two parts 54 and 55. Between these parts is positioned a second guide ring 56 also having a plurality of guide holes therein. Pole piece 53 is held in position within the extension 3 by the support cup 23 as shown. The two guide rings 51 and 56 are not clamped between their respective pole pieces but are free to expand under the heat of operation of the magnetron. This prevents any binding action which might otherwise occur.

I have illustrated my invention as applied to a twelve cavity magnetron although it may be applied to a magnetron having any number of cavities or to any tube structure requiring similar operating features. Referring to Fig. 2, I have shown a view of the magnetron looking toward a plane passing perpendicular through the axis of symmetry and showing the twelve cavities and the C-ring or capacitance varying element of my invention. The twelve cavities are formed by brazing a plurality of vanes 57 around the inner diameter of the body 1 as shown. Each cavity constitutes in effect a quarter wave line which, when resonating, has a magnetic flux concentration adjacent its shorted end, the short being the inner wall of the body 1. This is the region of high current density as is well known. Between the inner surfaces of the vanes is the region of maximum concentration of electric flux, this being point of maximum alternating potential difference.

In order to change the resonant frequency of the magnetron two means are provided, one, an L-ring 58 (shown in Fig. 3), the other, a C-ring 59, (shown in Fig. 2). The L-ring comprises a plurality of metal or conducting elements preferably formed by milling out slots in a solid metal piece whereby a unitary structure is obtained. The conducting elements are of a size such that they may freely enter and egress the cavities in the region of magnetic flux concentration. As the elements enter this region the effective inductance of the cavities is decreased and the cavities become resonant at a higher frequency.

The C-ring of my invention also comprises a plurality of conducting elements formed in a manner similar to that of the L-ring. The dimensions and size of these elements, which are wedge-shaped, are such that they may freely enter or egress the cavities in the region of maximum electric flux concentration. As the elements of the C-ring enter this region the effective capacitance of the cavities is increased and the cavities become resonant at a lower frequency, the increase in capacitance is due to the actual decrease in the effective spacing between the ends of vanes thus increasing the electrostatic flux concentration, the increase progressing substantially directly with the distance that the wedge-shaped members enter the cavities. It is not essential that the conducting elements be wedge-shaped but it is preferable when they are used with plural cavity magnetrons in which the cavities are formed by the spaces between radial vanes as in this case the cavities are also wedge-shaped. It is desirable that the spaces between the ends of the vanes be closed as completely as possible consistant with voltage breakdown limitations, for then the greatest change in capacitance occurs. The L-ring and the C-ring are mounted on a plurality of metal guide rods 60 and 61 so that together with the latter a unitary metal or conducting structure is formed. The L-ring and the C-ring are positioned in general on opposite sides of the resonant cavities in a manner such that as one ring enters the cavities the other ring emerges therefrom. This provides a more uniform variation of frequency with respect to the rectilinear motion of the rings and also permits of a greater range of frequencies with a smaller motion.

As shown in Fig. 1, the guide rods 60 are somewhat longer than guide rods 61. The rods of the two groups alternate around the L-ring and C-ring structures. It will be seen that the longer rods 60 extend a considerable distance beyond both sides of ring structures and pass through and are journaled in the guide holes of the guide rings 51 and 56. The shorter rods 61 extend only to one side of the C-ring structure and are journaled in only one guide ring. On the other side, the guide rods 61 are fastened into larger rods 62, the latter being fastened to both the L-ring 58 and the platform 5. Thus it will be seen that a motion of the platform is transmitted to the L-ring and C-ring structure whereby an adjustment or tuning of the civities is accomplished. By employing a plurality of small guide rods and bearings arranged on a circle having a diameter relatively great with respect to the diameters of the rods, the tendency for the mechanism to bind is substantially eliminated. It has also been found that the above described guiding arrangement as applied to the movable elements of a magnetron has resulted in a lesser tendency for the magnetron to operate parasitically or on undesired modes.

The guide rods 60 and 61 are preferably made of tungsten while the guide rings may be made of copper. It has been found that the combination of tungsten and copper makes a very good bearing which will stand up under the temperatures and other conditions encountered in vacuum at super high frequencies.

As is well known when the magnetron is in operation the instantaneous oscillating potentials on the adjacent vanes which form the cavities are equal and opposite. In other words the currents in adjacent cavities are of opposite phase. The currents in alternate cavities are therefore in like phase. To closely couple the alternate cavities together and to force them to oscillate in effect as a single cavity, the alternate vanes are fastened together by straps 63 and 64.

Oscillatory energy from the cavities of the magnetron is extracted for useful work by coupling a wave guide 65 to one of the cavities through an impedance transformer. The transformer comprises a pair of ramps 66 positioned within a horn shaped member 67. Adjacent the cavities the ramps are close together and therefore of low impedance to substantially match the impedance of the cavities. The ramps diverge outwardly and as they approach the wave guide 65, their separation and the internal dimensions of the horn determines their impedance which is designed to substantially match that of the wave guide.

Although the impedance transformer is apparently coupled to only one cavity, the fact that alternate vanes are strapped together results in the transformer being actually closely coupled to all cavities which as aforesaid oscillate as a unit.

In order that the magnetron may be evacuated and still transmit wave energy from the impedance transformer into the wave guide an insulating window 71 is sealed over the outer end of the horn 67. The window is elliptical in shape and so dimensioned that at approximately the mean frequency to which the magnetron may be tuned it represents a substantially infinite impedance across the wave guide and therefore does not appreciably influence the operation of the magnetron.

The elements of the magnetron which carry the oscillatory currents may be made of copper if moderate powers are to be generated. However, greater powers may be generated by employing elements made of tungsten or other highly refractory metal.

The magnetron is preferably liquid cooled and this has been illustrated by the tubing 68 through which a coolant flows. The control assembly 4 may also be liquid cooled as shown by the inlet and outlet tubing 69 positioned in the central hollow portion of the rod 9.

Many modifications of my invention will occur to one skilled in the art and it is my intention that the scope of my invention be not limited to the single embodiment shown but only by the objects of my invention and the appended claims.

What is claimed is:

1. A capacitance varying element for a multi-cavity-resonator magnetron having a plurality of vanes radially disposed about an axis and in electrical operative relation at their outer ends with a substantially circular conductor to form a plurality of cavity resonators, said vanes being spaced from each other in a circle about the axis, comprising a C-ring including a unitary metallic body having a plurality of conducting members also radially disposed about an axis and similarly spaced from each other in substantially the same circle about the axis, said conducting members being mounted adjacent the inner portions of the vanes, and a support for said unitary metallic body for connecting said C-ring to a common adjustable support whereby said members may be moved axially as a unit to a predetermined position between said vanes.

2. A capacitance varying element for a multi-cavity-resonator magnetron having a plurality of vanes radially disposed about an axis and in electrical operative relation at their outer ends with a substantially circular conductor to form a plurality of cavity resonators, said vanes being spaced from each other in a circle about the axis, comprising a C-ring having a plurality of conducting members also radially disposed about an axis and similarly spaced from each other in substantially the same circle about the axis, each of said conducting members being wedge-shaped and being mounted between the inner portions of the vanes, and a support for said conducting members for connecting them to a common adjustable support whereby said members may be moved axially as a unit to a predetermined position between said vanes.

CHARLES V. LITTON.

REFERENCES CITED

The following references are of record in the file of this patent:

UNITED STATES PATENTS

| Number | Name | Date |
|---|---|---|
| 2,408,234 | Spencer | Sept. 24, 1946 |
| 2,449,794 | Steele | Sept. 21, 1948 |